(12) United States Patent
Chang et al.

(10) Patent No.: US 7,720,647 B2
(45) Date of Patent: May 18, 2010

(54) SYSTEM AND METHOD FOR FILTERING A POINT CLOUD

(75) Inventors: Chih-Kuang Chang, Taipei Hsien (TW); Xin-Yuan Wu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 368 days.

(21) Appl. No.: 11/615,941

(22) Filed: Dec. 23, 2006

(65) Prior Publication Data

US 2008/0043035 A1 Feb. 21, 2008

(30) Foreign Application Priority Data

Aug. 18, 2006 (CN) .................. 2006 1 0062199

(51) Int. Cl.
*G09G 5/00* (2006.01)
(52) U.S. Cl. ...................................... 702/190
(58) Field of Classification Search .................. 702/190
See application file for complete search history.

(56) References Cited

U.S. PATENT DOCUMENTS

| | | | |
|---|---|---|---|
| 7,047,151 B2 | 5/2006 | Chang | |
| 7,065,461 B2 | 6/2006 | Chang | |
| 2007/0253635 A1* | 11/2007 | Chang et al. | 382/260 |
| 2009/0048782 A1* | 2/2009 | Chang et al. | 702/5 |
| 2009/0055096 A1* | 2/2009 | Chang et al. | 702/5 |
| 2009/0063105 A1* | 3/2009 | Chang et al. | 703/1 |

OTHER PUBLICATIONS

Fu-Chen Chou, Yi-Hsing Tseng, An Adaptive Point Cloud Filtering Algorithm for DEM Generation from Airborne Lidar Data, Issued Paper, Jun. 30, 2004, pp. 29, 30, 37 and Figure 3.1, Taiwan.

* cited by examiner

*Primary Examiner*—Tung S Lau
(74) *Attorney, Agent, or Firm*—Wei Te Chung

(57) ABSTRACT

An exemplary method for filtering a point cloud is disclosed. The method includes the steps of: acquiring a point cloud from a point cloud obtaining device; identifying an outmost point on each of surface edges of the point cloud in a coordinate system; determining a cubical figure that confines the point cloud and intersects at surface points of the point cloud; deriving the length, the width and the height of the cubical figure; mapping a grid on the cubical figure of the point cloud and obtaining a plurality of grid squares; and processing points in each of the grid squares to retain a selected point having a smallest distance from a center of the grid square and delete redundant points in the grid square, thereby yielding a filtered point cloud. A related system is also disclosed.

6 Claims, 4 Drawing Sheets

SYSTEM AND METHOD FOR FILTERING A POINT CLOUD

BACKGROUND OF THE INVENTION

1. Field of the Invention

The present invention relates to point cloud editing systems and methods, and more particularly, is related to a system and method for filtering a point cloud via a computer aided verification (CAV) tool.

2. Description of Related Art

Product quality has long been one of the most important factors in maintaining manufacturing enterprises competitiveness. Improving the product quality is an important ongoing pursuit of the manufacturing enterprises. It is essential to verify a component correctness and a component accuracy of various manufactured products. There is now a burgeoning need to verify components of products rapidly and precisely. Nevertheless, many manufacturing enterprises still perform verification by employing numerous manual tasks and test programs that are non-standard. This can seriously affect the accuracy and consistency of the verification performed.

In recent years, with performances of computer hardware and software continually improving, computers play a major role when performing verification operations on an object. Computer equipment can greatly improve the efficiency and accuracy of verification. For example, a scanning device scans an object to be verified to obtain a point cloud, and inputs the point cloud to the computer to form a digitalized figure of the object. The object will be verified by analyzing and processing the point cloud by executing particular software installed in the computer. The art of analyzing and processing data on an object is disclosed in patents such as U.S. Pat. No. 6,738,727, entitled System and Methods for Analyzing and Processing data on an object. This invention can automatically measure the object and help to guide production by comparing the measurement data with the design data. The system comprises an automatic scanning and measuring sub-system for obtaining point cloud by scanning the object and generating measurement data on the object by processing the point cloud.

Even though the system discloses how to obtain a point cloud, there are many redundant points mixed within the point cloud, the many redundant points would influence the processing speed and accuracy of the point cloud. Current technology does not teach how to filter redundant points automatically and users always have to filter them manually.

Therefore, what is needed is a system and method for filtering a point cloud, which is capable of filtering the point cloud automatically and accurately.

SUMMARY OF THE INVENTION

A computing system for filtering a point cloud includes an acquiring module configured for acquiring a point cloud from a point cloud obtaining device and a filtering module configured for filtering redundant points in the point cloud to obtain a filtered point cloud. The filtering module comprises a calculating sub-module configured for identifying an outmost point on each of surface edges of the point cloud in a coordinate system, determining a cubical figure that confines the point cloud and intersects at surface points of the point cloud, and deriving the length, the width and the height of the cubical figure; a mapping sub-module configured for mapping a grid on the cubical figure of the point cloud according to the length, the width, the height of the cubical figure and an axes interval of the grid that is preconfigured by users, and obtaining a plurality of grid squares; and a redundant point deleting sub-module configured for processing points in each of the grid squares to retain a selected point having a smallest distance from a center of the grid square and delete redundant points in the grid square, thereby yielding the filtered point cloud.

A computer-based method for filtering a point cloud includes the steps of: (a) acquiring a point cloud from a point cloud obtaining device; (b) identifying an outmost point on surface edges of the point cloud in a coordinate system; (c) determining a cubical figure that confines the point cloud and intersects at surface points of the point cloud; (d) deriving the length, the width and the height of the cubical figure; (e) mapping a grid on the cubical figure of the point cloud according to the length, the width, the height of the cubical figure and an axes interval of the grid that is preconfigured by users, and obtaining a plurality of grid squares; and (f) processing points in each of the grid squares to retain a selected point having a smallest distance from a center of the grid square and delete redundant points in the grid square, thereby yielding a filtered point cloud.

Other objects, advantages and novel features of the embodiments will be drawn from the following detailed description together with the attached drawings, in which:

DETAILED DESCRIPTION OF THE INVENTION

Figure 1:
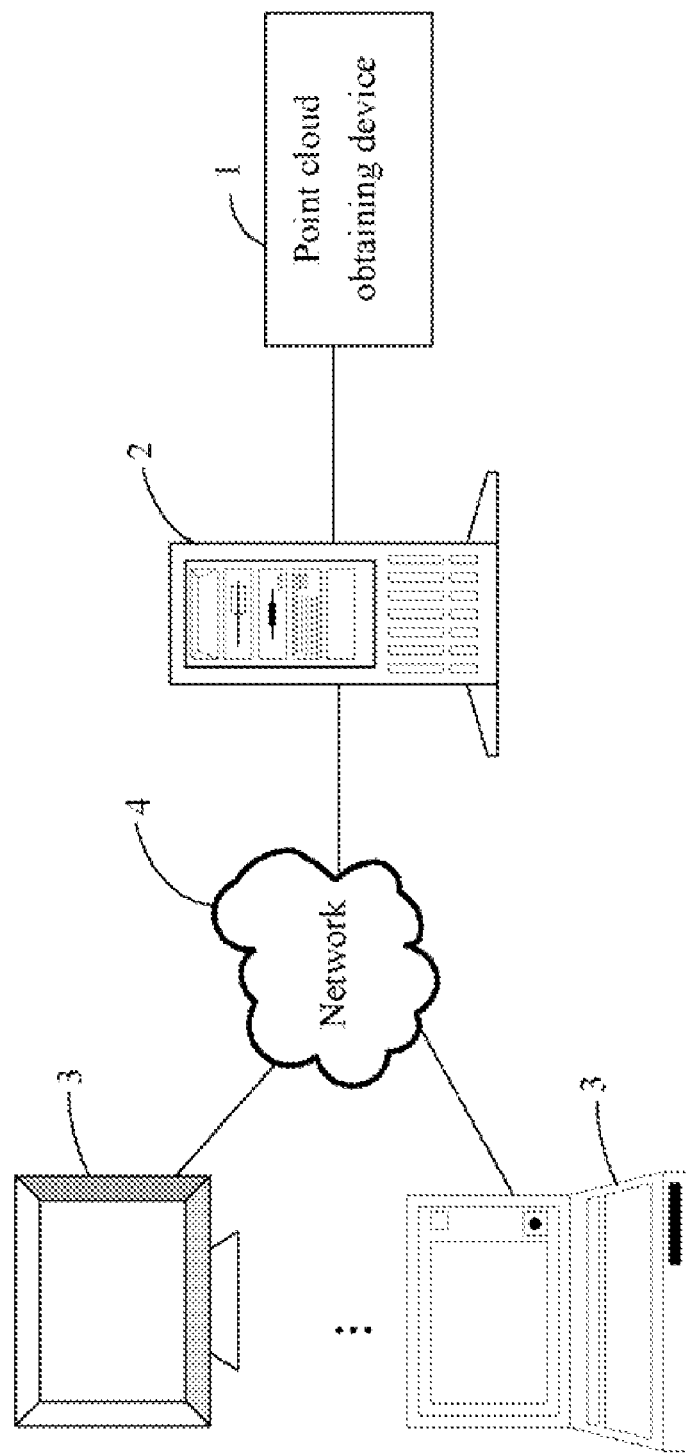
FIG. 1 is a schematic diagram of a hardware configuration of a system for filtering a point cloud in accordance with a preferred embodiment.

FIG. 1 is a schematic diagram of a hardware configuration of a system for filtering a point cloud (hereinafter, "the system") in accordance with a preferred embodiment. The system may include a point cloud obtaining device 1, an application server 2, and a plurality of client computers 3 (only two shown). The client computers 3 connect to the application server 2 via a network 4. The network 4 may be an intranet, the Internet, or any other suitable type of communication links.

The point cloud obtaining device 1 connects with the application server 2, and is provided for obtaining a point cloud by scanning a physical object. In the preferred embodiment, the point cloud obtaining device 1 is a scanning machine.

The application server 2 is configured for simulating a digitalized figure based on the point cloud, and filtering redundant points in the digitalized figure to obtain a filtered point cloud. The application server 2 is installed with a plurality of software function modules that are used for processing the point cloud. The client computers 3 may be located at various locations (e.g., different internal departments) of an organization with the system. Each client computer 3 provides a graphical user interface (GUI) for displaying the digitalized figure.

Figure 2:
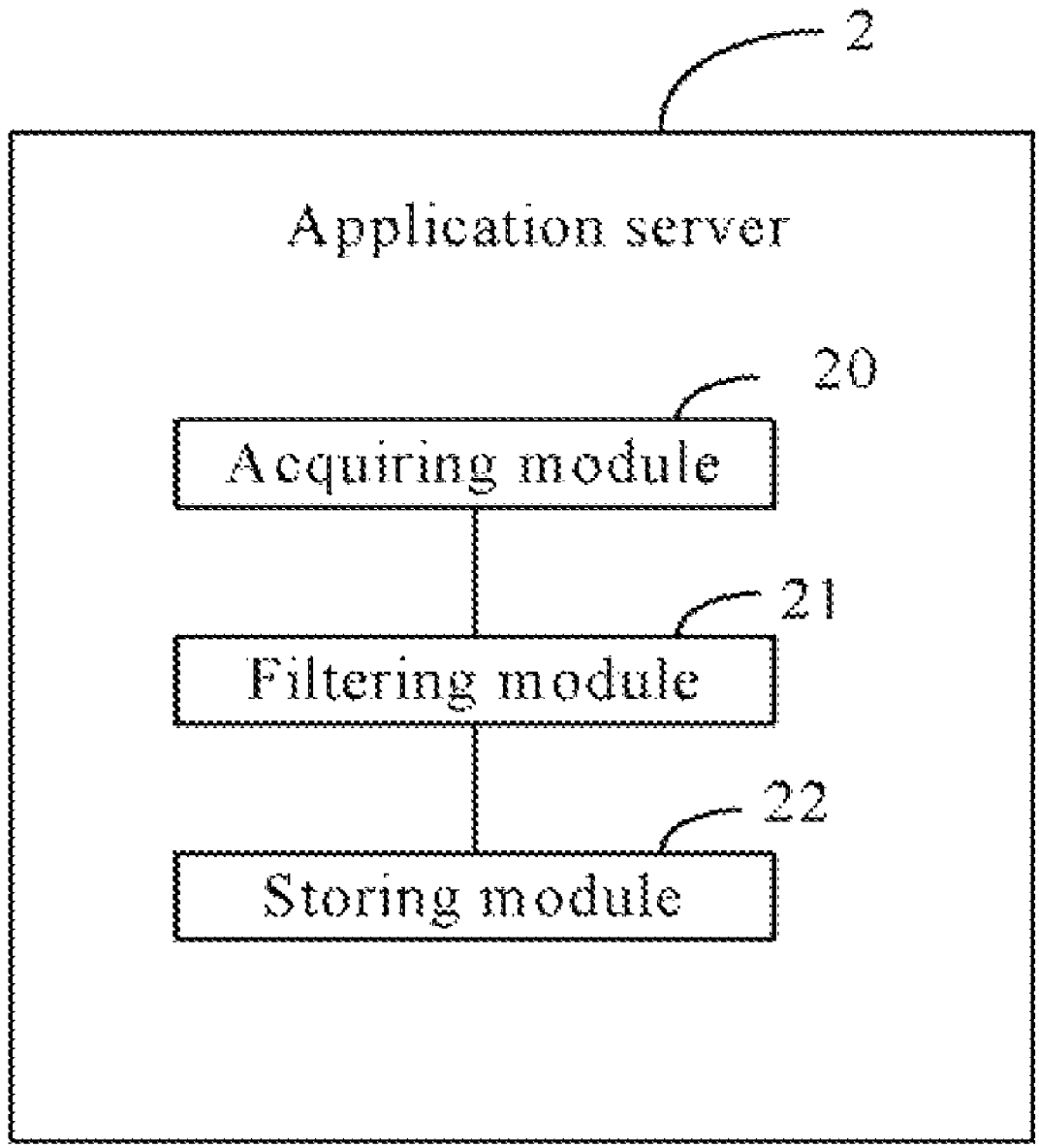
FIG. 2 is a schematic diagram of main function modules of the application server of the system of FIG. 1.

FIG. 2 is a schematic diagram of main function modules of the application server 2. The application server 2 typically includes an acquiring module 20, a filtering module 21, and a storing module 22.

The acquiring module 20 is configured for acquiring the point cloud from the point cloud obtaining device 1, simulating the digitalized figure based on the point cloud, and displaying the digitalized figure on a display of any client computers 3.

The filtering module 21 is configured for filtering redundant points in the point cloud to obtain a filtered point cloud.

The storing module 22 is configured for storing the filtered point cloud in the application server 2.

Figure 3:
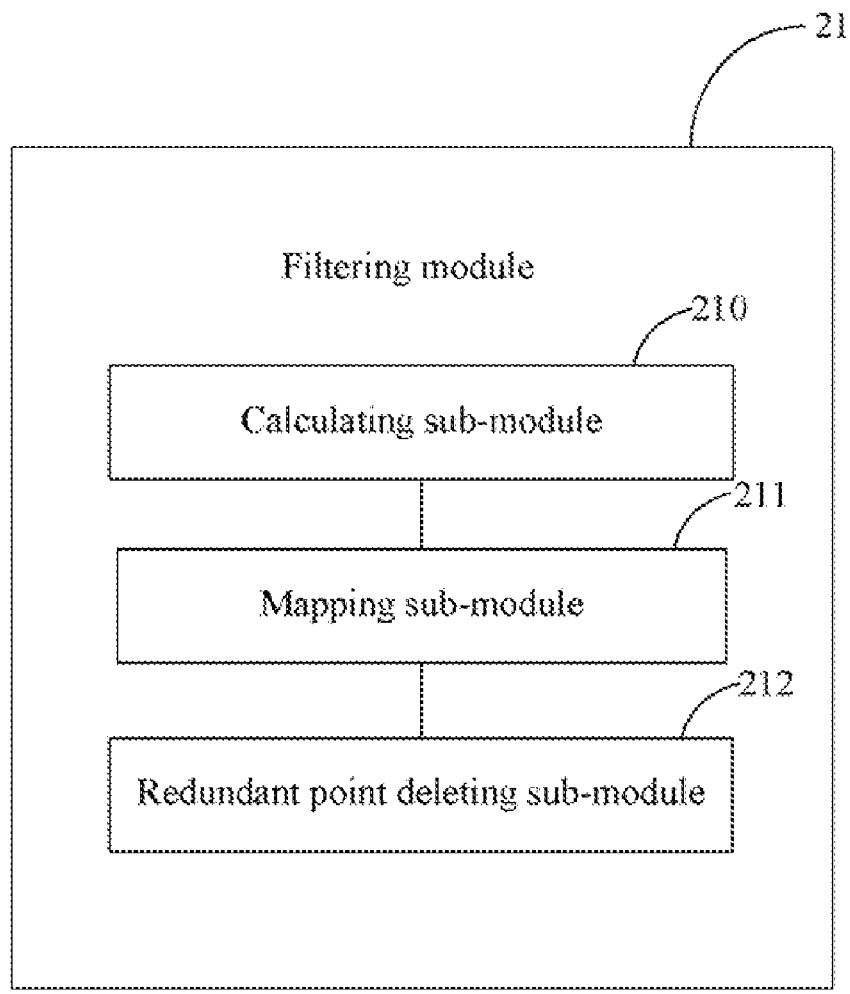
FIG. 3 is a schematic diagram of main function sub-modules of the filtering module of FIG. 2.

FIG. 3 is a schematic diagram of main function sub-modules of the filtering module 21. The filtering module 21 includes a calculating sub-module 210, a mapping sub-module 211, and a redundant point deleting sub-module 212.

The calculating sub-module 210 is configured for identifying an outermost point on each of surface edges of the point cloud in the coordinate system by analyzing coordinates of the outermost point on each of the surface edges of the point cloud, and determining a cubical figure that confines the point cloud and intersects at surface points of the point cloud. The calculating sub-module 210 also derives the length, the width and the height of the cubical figure.

The mapping sub-module 211 is configured for mapping a grid on the cubical figure according to the length, the width, the height of the cubical figure and an axes interval of the grid that is preconfigured by users. Specifically, the mapping sub-module 211 first computes an axes quantity in surfaces of the cubical figure based on the length, the width, the height of the cubical figure and the axes interval of the grid, and then grids the cubical figure with a plurality of grid squares according to the axes quantity of each of the surfaces of the cubical figure.

The redundant point deleting sub-module 212 is configured for processing points in each of the grid squares to retain a selected point having a smallest distance from a center of the grid square and delete redundant points in the grid square, thereby yielding the filtered point cloud. Each of the grid squares of the cubical figure is processed as an unanalyzed square in the following descriptions:

The redundant point deleting sub-module 212 computes coordinates of the center of an unanalyzed grid square, and calculates a distance of each point in the grid square from the center. The redundant point deleting sub-module 212 retains a selected point having the distance that is shortest, and removes the other points in the grid square. The filtered point cloud is obtained after each of the grid squares is processed as described above.

Figure 4:
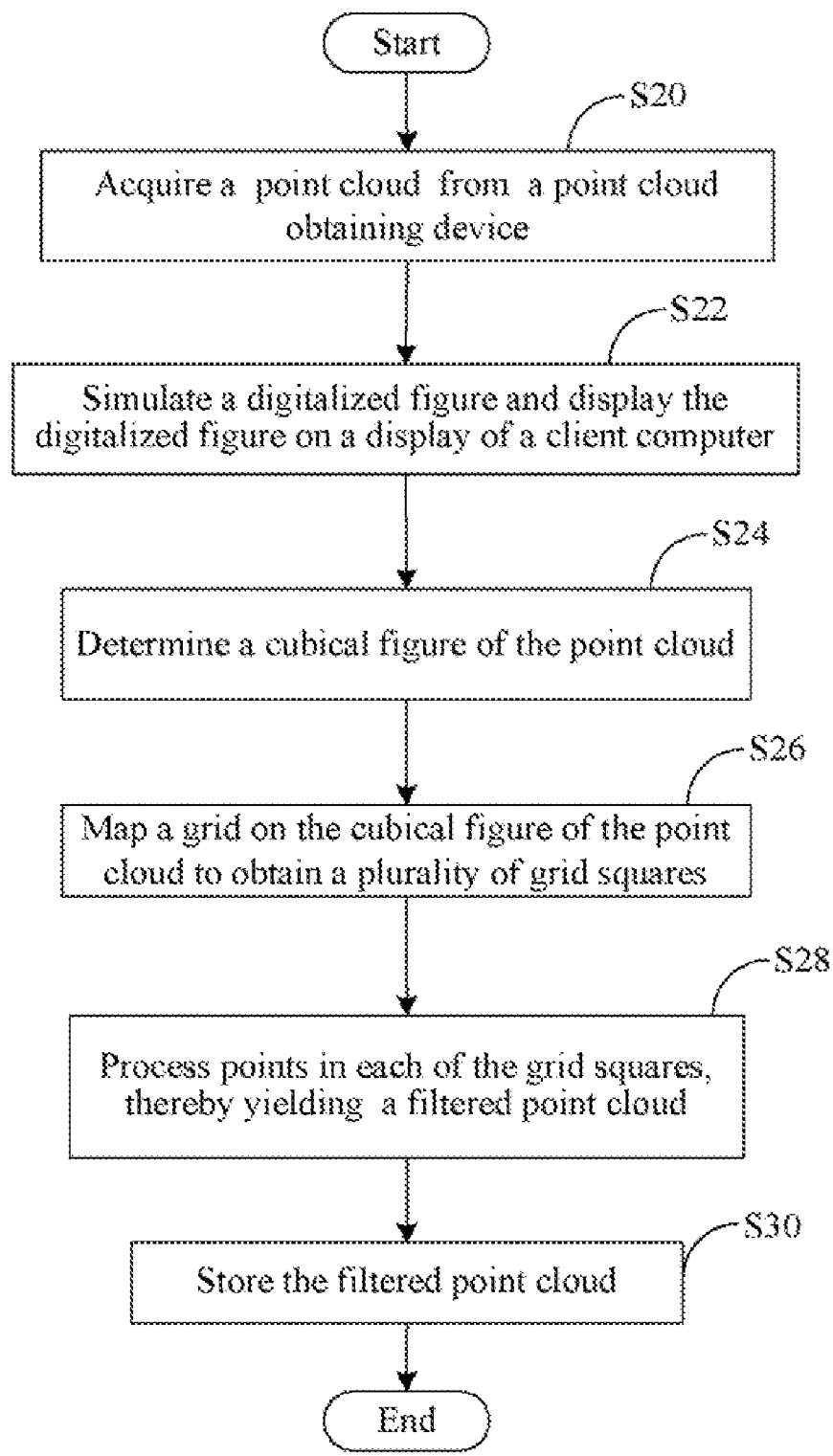
FIG. 4 is a flow chart of a preferred method for filtering a point cloud by utilizing the system of FIG. 1.

FIG. 4 is a flow chart of a preferred method for filtering the point cloud by utilizing the system of FIG. 1. In step S20, the acquiring module 20 acquires the point cloud from the point cloud obtaining device 1.

In step S22, the acquiring module 20 simulates the digitalized figure based on the point cloud, and displays the digitalized figure on the display of any of the client computers 3.

In step S24, the calculating sub-module 210 identifies the outermost point on each of surface edges of the point cloud in the coordinate system by analyzing coordinates of the outermost point on each of the surface edges of the point cloud, and determines the cubical figure that confines the point cloud and intersects at surface points of the point cloud. The calculating sub-module 210 also derives the length, the width and the height of the cubical figure.

In step S26, the mapping sub-module 211 maps the grid on the cubical figure according to the length, the width, the height of the cubical figure and the axes interval of the grid that is preconfigured by users. Specifically, the mapping sub-module 211 first computes the axes quantity in surfaces of the cubical figure based on the length, the width, the height of the cubical figure and the axes interval of the grid, and then grids the cubical figure with the plurality of grid squares according to the axes quantity of each of the surfaces of the cubical figure.

In step S28, the redundant point deleting sub-module 212 processes points in each of the grid squares to retain the selected point having the smallest distance from the center of the grid square and delete redundant points in the grid square, thereby yielding the filtered point cloud. Each of the grid squares of the cubical figure is processed as an unanalyzed square in the following descriptions:

The redundant point deleting sub-module 212 computes coordinates of the center of an unanalyzed grid square, and calculates a distance of each point in the grid square from the center. The redundant point deleting sub-module 212 retains the selected point having the distance that is shortest, and removes the other points in the grid square. The filtered point cloud is obtained after each of the grid squares is processed as described above.

In step S30, the storing module 22 stores the filtered point cloud in the application server 2.

It should be emphasized that the above-described embodiments of the present invention, particularly, any "preferred" embodiments, are merely possible examples of implementations, set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure, and the present invention is protected by the following claims.

What is claimed is:

1. A computer-based method for filtering a point cloud, the method comprising the steps of:
   scanning a physical object to obtain a point cloud of the physical object by using a scanning machine;
   identifying an outmost point on each of surface edges of the point cloud in a coordinate system;
   determining a cubical figure that confines the point cloud and intersects at surface points of the point cloud according to the outmost point on each of the surface edges;
   deriving the length, the width and the height of the cubical figure;
   mapping a grid on the cubical figure of the point cloud according to computation of an axes quantity of surfaces of the cubical figure based on the length, the width, the height of the cubical figure and an axes interval of the grid that is preconfigured by users;
   mapping a plurality of grid squares on the cubical figure according to the axes quantity of each of the surfaces of the cubical figure by using the mapping sub-module;
   processing points in each of the grid squares to retain a selected point having a smallest distance from a center of the grid square and delete redundant points in the grid square, thereby yielding a filtered point cloud; and
   storing the filtered point cloud in an application server.

2. The method according to claim 1, further comprising the step of:
   simulating a digitalized figure based on the point cloud, and displaying the digitalized figure on a display of a client computer.

3. A computing system for filtering a point cloud, the computing system comprising:
   an acquiring module configured for acquiring a point cloud from a point cloud obtaining device;

a filtering module configured for filtering redundant points in the point cloud to obtain a filtered point cloud, the filtering module comprising:

a calculating sub-module configured for identifying an outmost point on each of surface edges of the point cloud in a coordinate system, determining a cubical figure that confines the point cloud and intersects at surface points of the point cloud according to the outmost point on each of the surface edges, and deriving the length, the width and the height of the cubical figure;

a mapping sub-module configured for mapping a grid on the cubical figure of the point cloud according to computation of an axes quantity of surfaces of the cubical figure based on the length, the width, the height of the cubical figure and an axes interval of the grid that is preconfigured by users, and mapping a plurality of grid squares on the cubical figure according to the axes quantity of each of the surfaces of the cubical figure; and a redundant point deleting sub-module configured for processing points in each of the grid squares to retain a selected point having a smallest distance from a center of the grid square and delete redundant points in the grid square, thereby yielding the filtered point cloud.

4. The computing system according to claim 3, wherein the point cloud obtaining device is configured for obtaining the point cloud by scanning a physical object.

5. The computing system according to claim 3, further comprising a storing module configured for storing the filtered point cloud in a storage device of the computing system.

6. The computing system according to claim 3, wherein the acquiring module is further configured for simulating a digitalized figure based on the point cloud, and displaying the digitalized figure on a display of the computing system.

* * * * *